United States Patent
Zhao et al.

(10) Patent No.: US 11,394,506 B2
(45) Date of Patent: Jul. 19, 2022

(54) COMMUNICATION SYSTEM, GATEWAY DEVICE, TERMINAL DEVICE AND COMMUNICATION METHOD FOR REDUCING POWER CONSUMPTION

(71) Applicant: BOE Technology Group Co., Ltd., Beijing (CN)

(72) Inventors: Kai Zhao, Beijing (CN); Wei Deng, Beijing (CN); Pan Ni, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 77 days.

(21) Appl. No.: 16/881,217

(22) Filed: May 22, 2020

(65) Prior Publication Data
US 2021/0135811 A1    May 6, 2021

(30) Foreign Application Priority Data
Oct. 30, 2019    (CN) .......................... 201911048213.0

(51) Int. Cl.
*H04L 5/00* (2006.01)
*H04L 12/28* (2006.01)
*H04W 52/02* (2009.01)

(52) U.S. Cl.
CPC .......... *H04L 5/0048* (2013.01); *H04L 5/0053* (2013.01); *H04L 5/0096* (2013.01); *H04W 52/0229* (2013.01); *H04W 52/0235* (2013.01)

(58) Field of Classification Search
None
See application file for complete search history.

(56) References Cited

U.S. PATENT DOCUMENTS

| | | | | |
|---|---|---|---|---|
| 7,298,772 | B1 * | 11/2007 | Neerudu | H04L 27/2662 375/136 |
| 9,961,718 | B2 * | 5/2018 | Vajapeyam | H04W 72/042 |
| 2011/0150252 | A1 * | 6/2011 | Solum | H04R 25/55 381/314 |
| 2011/0176465 | A1 * | 7/2011 | Panta | H04W 52/0235 370/311 |
| 2015/0103707 | A1 * | 4/2015 | Panta | H04W 4/38 370/311 |
| 2017/0079257 | A1 * | 3/2017 | Haensgen | H04W 84/18 |

(Continued)

FOREIGN PATENT DOCUMENTS

| | | |
|---|---|---|
| CN | 106664283 A | 5/2017 |
| CN | 109041181 A | 12/2018 |

(Continued)

OTHER PUBLICATIONS

First Office Action dated Jan. 6, 2022 for application No. CN201911048213.0 with English translation attached.

*Primary Examiner* — Sai Aung
(74) *Attorney, Agent, or Firm* — Nath, Goldberg & Meyer; Joshua B. Goldberg (57) ABSTRACT

The present disclosure provides a communication system, a gateway device, a terminal device and a communication method. The communication method includes: receiving, by a terminal device, a first packet from a gateway device, the first packet including a first preamble; transmitting, by the terminal device, a second packet to the gateway device, the second packet including a second preamble, a length of the first preamble is greater than a length of the second preamble.

16 Claims, 8 Drawing Sheets

(56) References Cited

U.S. PATENT DOCUMENTS

2017/0367118 A1* 12/2017 Choi .................... H04W 84/12
2019/0335396 A1* 10/2019 Yang .................... H04L 1/1883

FOREIGN PATENT DOCUMENTS

| CN | 109075861 A | 12/2018 |
| CN | 109842919 A | 6/2019 |
| CN | 110169143 A | 8/2019 |
| CN | 110312299 A | 10/2019 |
| WO | 2018126408 A1 | 7/2018 |

* cited by examiner

COMMUNICATION SYSTEM, GATEWAY DEVICE, TERMINAL DEVICE AND COMMUNICATION METHOD FOR REDUCING POWER CONSUMPTION

CROSS-REFERENCE TO RELATED APPLICATION

This application claims priority to Chinese Patent Application No. 201911048213.0, filed on Oct. 30, 2019, the contents of which are incorporated herein by reference in the entirety.

TECHNICAL FIELD

The present disclosure relates to the field of communication technology, more particularly, to a communication system, a gateway device, a terminal device, and a communication method.

BACKGROUND

LoRa technology is a long-distance wireless transmission technology based on spread spectrum technology, which is one of LPWAN (Low-Power Wide-Area Network) communication technologies. This solution provides users with a simple wireless communication method that can achieve long distance and low power consumption. At present, LoRa mainly operates in the ISM frequency band (Industrial Scientific Medical Band), including 433 MHz, 868 MHz, 915 MHz, etc.

SUMMARY

In one aspect, the present disclosure provides a communication method, including: receiving, by a terminal device, a first packet from a gateway device by a terminal device, the first packet comprising a first preamble; and transmitting, by a terminal device, a second packet to the gateway device, the second packet comprising a second preamble, a length of the first preamble is greater than a length of the second preamble.

According to an embodiment of the present disclosure, a transmission duration of the first preamble is a first duration. The communication method further includes: before the receiving, by a terminal device, a first packet from a gateway device, causing the terminal device to sleep for a second duration; and performing, by the terminal device, a channel activity detection for a third duration, wherein the second duration is greater than the third duration, and a sum of the second duration and the third duration is less than or equal to the first duration.

According to an embodiment of the present disclosure, the receiving, by a terminal device, a first packet from a gateway device includes: receiving, by the terminal device, the first packet when the first preamble is detected through the channel activity detection.

According to an embodiment of the present disclosure, the receiving, by a terminal device, a first packet from a gateway device further includes: repeating the causing the terminal device to sleep for a second duration and the performing, by the terminal device, a channel activity detection for a third duration when the first preamble is not detected through the channel activity detection, until the first preamble is detected through the channel activity detection.

According to an embodiment of the present disclosure, the communication method further includes: before the receiving, by a terminal device, a first packet from a gateway device, transmitting a network access request to the gateway device by the terminal device according to a terminal transmitting parameter. The receiving, by a terminal device, a first packet from a gateway device further includes: receiving, by the terminal device, the first packet according to a terminal receiving parameter when the first preamble is detected through the channel activity detection, after completing the transmitting a network access request and the terminal device having gained access to a network.

According to an embodiment of the present disclosure, the terminal transmitting parameter includes the length of the second preamble, and the terminal receiving parameter includes the length of the first preamble.

In another aspect, the present disclosure also provides a communication method, including: transmitting, by a gateway device, a first packet to a terminal device, the first packet including a first preamble; receiving, by the gateway device, a second packet from the terminal device, the second packet including a second preamble; a length of the first preamble is greater than a length of the second preamble.

According to an embodiment of the present disclosure, the communication method further includes: before the transmitting, by a gateway device, a first packet to a terminal device, receiving, by the gateway device, a network access request from the terminal device according to a gateway receiving parameter. The transmitting, by a gateway device, a first packet to a terminal device includes: transmitting, by the gateway device, the first packet according to a gateway transmitting parameter, after receiving the network access request, analyzing the network access request and the terminal device having gained access to a network.

According to an embodiment of the present disclosure, the transmitting, by a gateway device, a first packet to a terminal device further includes: transmitting, by the gateway device, the first packet according to the gateway transmitting parameter, when the network access request is not received and after the terminal device has gained access to the network.

According to an embodiment of the present disclosure, the gateway receiving parameter includes the length of the second preamble, and the gateway transmitting parameter includes the length of the first preamble.

In another aspect, the present disclosure also provides a terminal device, including: a receiving circuit configured to receive a first packet from a gateway device, the first packet including a first preamble; and a first transmitting circuit configured to transmit a second packet to the gateway device, the second packet including a second preamble, a length of the first preamble is greater than a length of the second preamble.

According to an embodiment of the present disclosure, a transmission duration of the first preamble is a first duration. The terminal device further includes: a sleep circuit configured to cause the terminal device to sleep for a second duration; and a detection circuit configured to perform a channel activity detection for a third duration, the second duration is greater than the third duration, and a sum of the second duration and the third duration is less than or equal to the first duration.

According to an embodiment of the present disclosure, the receiving circuit is further configured to: receive the first packet when the detection circuit detects the first preamble; and call the sleep circuit and the detection circuit repeatedly when the detection circuit does not detect the first preamble, until the detection circuit detects the first preamble.

According to an embodiment of the present disclosure, the terminal device further includes: a second transmitting circuit configured to transmit a network access request to the gateway device according to a terminal transmitting parameter. The receiving circuit is further configured to: receive the first packet according to the terminal receiving parameter when the detection circuit detects the first preamble, after that the second transmitting circuit completes a transmission of the network access request and the terminal device has gained access to a network.

According to an embodiment of the present disclosure, the terminal transmitting parameter includes the length of the second preamble, and the terminal receiving parameter includes the length of the first preamble.

In another aspect, the present disclosure also provides a gateway device that performs the foregoing communication method, including: a transmitting circuit configured to transmit a first packet to a terminal device, the first packet including a first preamble; and a first receiving circuit configured to receive a second packet from the terminal device, the second packet including a second preamble, a length of the first preamble is greater than a length of the second preamble.

According to an embodiment of the present disclosure, the gateway device further includes: a second receiving circuit configured to receive a network access request from the terminal device according to a gateway receiving parameter.

According to an embodiment of the present disclosure, the transmitting circuit is further configured to: transmit the first packet according to a gateway transmitting parameter after receiving the network access request, analyzing the network access request and the terminal device having gained access to the network.

According to an embodiment of the present disclosure, the transmitting circuit is further configured to: transmit the first packet according to the gateway transmitting parameter when the network access request is not received and after the terminal device has gained access to the network.

In another aspect, the present disclosure also provides a communication system including the foregoing terminal device and gateway device. The gateway device includes: a transmitting circuit configured to transmit a first packet to a terminal device, the first packet including a first preamble; and a first receiving circuit configured to receive a second packet from the terminal device, the second packet including a second preamble, the terminal device is configured to receive the first packet from the gateway device and transmit the second packet to the gateway device, a length of the first preamble is greater than a length of the second preamble.

BRIEF DESCRIPTION OF THE FIGURES

In order to more clearly explain the technical solutions of the embodiments of the present disclosure, the drawings required in the description of the embodiments of the present disclosure will be briefly introduced below. Obviously, the drawings in the following description are only some embodiments of the present disclosure, and those skilled in the art can obtain other drawings based on these drawings without creative labor. In the drawings.

DETAILED DESCRIPTION

To make those skilled in the art better understand the technical solutions of the present disclosure, the present disclosure will be further described in detail below in conjunction with the accompanying drawings and embodiments. It should be noted that the following description of some embodiments has been presented for purposes of illustration and description. It is not intended to be exhaustive or to limit to the precise forms disclosed, and the repeated description is omitted in order to avoid redundancy.

LoRa technology is a long-distance wireless transmission technology based on spread spectrum technology, and its advantage lies in the long-distance capability. A single gateway or base station can cover an entire city or a region of hundreds of square kilometers. At a given location, the distance depends largely on the environment or obstacles.

In order to reduce the power consumption of an apparatus based on LoRa technology, a data collection method based on LoRa low-power consumption wireless communication technology for a water meter is proposed in the related art, in which the water meter based on LoRa technology can actively reports data, and the water meter is turned off to reduce power consumption when it does not report data. Obviously, this method of reducing power consumption is only suitable for low frequency unidirectional data transmission systems. Therefore, it is necessary to provide a communication system that can reduce the power consumption of the terminal device in an application scenario of bidirectional data interaction.

Accordingly, the present disclosure provides a communication system, a gateway device, a terminal device, and a communication method that substantially obviate one or more of the problems due to limitations and disadvantages in the related art. In the present disclosure, since a length of a second preamble transmitted by the terminal device is shorter than a length of a first preamble transmitted by the gateway device, the power consumption of the terminal device can be greatly reduced for the terminal device that frequently transmits data interactively. In addition, since the shorter second preamble occupies a fewer channel, this can increase a number of terminal devices coupled to the single gateway device.

The communication method provided by the present disclosure is applicable to a system based on LoRa wireless communication or a wireless communication system based on FSK or the like adopting a preamble mechanism. The system based on LoRa wireless communication is taken as an example for description below.

Figure 1:
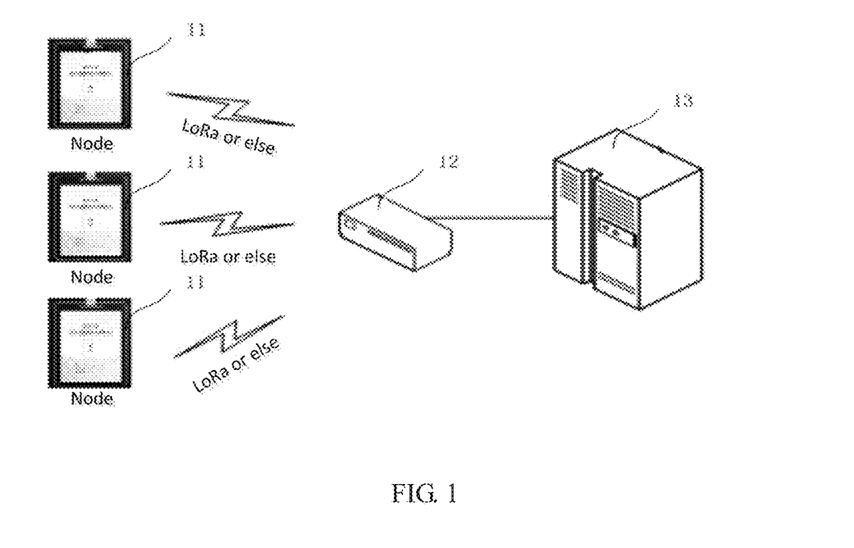
FIG. 1 shows an architecture diagram of a communication system according to an embodiment of the present disclosure.

FIG. 1 shows an architecture diagram of a communication system according to an embodiment of the present disclosure. Referring to FIG. 1, the communication system based on LoRa technology may include a terminal device 11 (e.g., a location badge, warehouse goods, a mobile phone, a notebook computer, a multimedia printer, etc.) and a gateway device 12 (e.g., a router, etc.), and may also include a server 13. The terminal device 11 may be configured to collect information and upload data to the gateway device 12 by a LoRa wireless signal. The gateway device 12 may be configured to relay the data uploaded by the terminal device 11 to the server 13 and relay data transmitted by the server 13 to the terminal device 11. The server 13 is configured to analyze the data uploaded by the terminal device 11, and control behaviors of the gateway device 12 and the terminal device 11. In order to enable to transmit and receive LoRa wireless signals, the terminal device 11 and the gateway device 12 may be provided with a LoRa radio frequency (RF) chip respectively.

Figure 2:
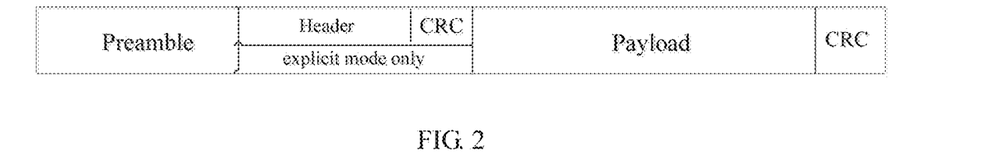
FIG. 2 shows a schematic structural diagram of a LoRa packet according to an embodiment of the present disclosure.

A composition of the LoRa packet (explicit or implicit) transmitted between the gateway device and the terminal device based on LoRa wireless communication is shown in FIG. 2, and the LoRa packet mainly includes: a preamble, a header of an optional type, a payload, etc., the header of an explicit packet is short, and mainly includes the following information, such as a number of bytes, a coding rate and whether CRC is used.

Herein, the preamble is used to keep a receiver and an input data stream to synchronize, and to remind a receiving chip that the signal to be transmitted is a valid signal and notice to receive, so as not to lose useful signals. After the preamble is transmitted, the valid data will be transmitted immediately. The RF chip based on LoRa technology (such as sx127x series chips) is integrated with a channel activity detection (CAD) function, and detect whether there is valid data to be received by detecting whether the preamble is transmitted in the channel by timing. Chips such as 4463 based on FSK modulation mode also have the function of detecting the preamble.

In some implementations, the preamble includes alternated data such as 0101 or 1010, but these data are meaningless for practical applications. The traditional wireless interaction maintains a length of the preamble at the receiving terminal to be equal to that of the preamble at the transmitting terminal for normal operation, and this may results in a huge power waste on the preambles at the receiving terminal and the transmitting terminal. For example, the gateway device is usually powered by a voltage of 220V, the power supply is stable, and data frames may be transmitted by using a long preamble. However, the terminal device is generally powered by batteries, thus it is required to reduce power consumption.

Figure 3:
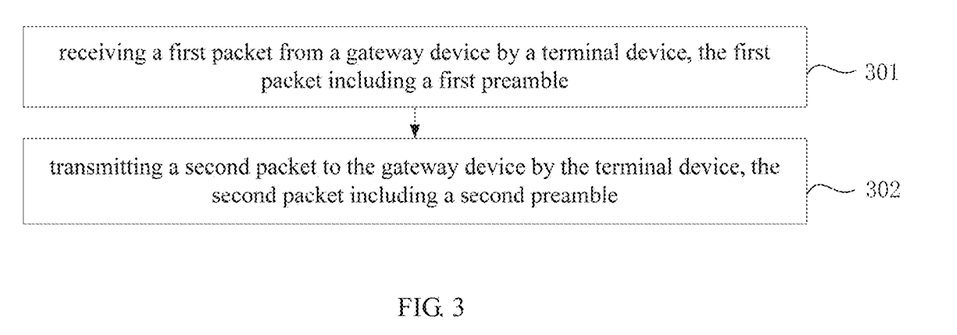
FIG. 3 shows a flowchart of a communication method of a terminal device according to an embodiment of the present disclosure.

In order to reduce the power consumption of the terminal device, the present disclosure provides a communication method for the terminal device. FIG. 3 shows a flowchart of a communication method for a terminal device according to an embodiment of the present disclosure. Referring to FIG. 3, the communication method may include steps 301 and 302.

In step 301, a first packet transmitted by a gateway device is received by the terminal device, and the first packet includes a first preamble.

In step 302, a second packet is transmitted to the gateway device by the terminal device, and the second packet includes a second preamble, a length of the first preamble is greater than a length of the second preamble.

In some implementations, the terminal device may be, for example, a location badge, warehoused goods, and so on.

In a case where other physical parameters of the gateway device and the terminal device are determined, the length of the preamble is proportional to a transmission duration of the preamble. The length of the first preamble is greater than the length of the second preamble, that is, the transmission duration of the first preamble is greater than the transmission duration of the second preamble. In some implementations, for example, the transmission duration of the first preamble (the longer preamble) is 618.75 ms, the transmission duration of the second preamble (the shorter preamble) is 2.8 ms, and a current when the terminal device transmits data is about 120 mA, the energy consumed in transmission of the preamble when the terminal device transmits each packet (the transmission period is 10 s) is 120 mA×2.8 ms/(1000× 3600)≈0.00009 mA·h. However, compared with a case where the transmission duration of the first preamble is the same as that of the preamble transmitted by the traditional terminal device (e.g., 618.75 ms), the energy consumed in transmission of the preamble when the terminal device transmits each packet (the transmission period is 10 s) is 120 mA×618.75 ms/(1000×3600)=0.02 mA·h. It can be seen that, for the terminal device that frequently transmit data to the gateway device interactively, it is possible to reduce power consumption greatly by using the communication method provided by the present disclosure compared with the conventional communication method.

According to the communication method provided by the present disclosure, the length of the second preamble transmitted by the terminal device is shorter than the length of the first preamble transmitted by the gateway device, thus for the terminal device that frequently transmits data interactively, such as an indoor positioning terminal device for Internet of Things, this can reduce power consumption of the terminal device greatly, in addition, since the shorter second preamble occupies a fewer channel, this can increase the number of terminal devices coupled to a single gateway device.

Figure 4:
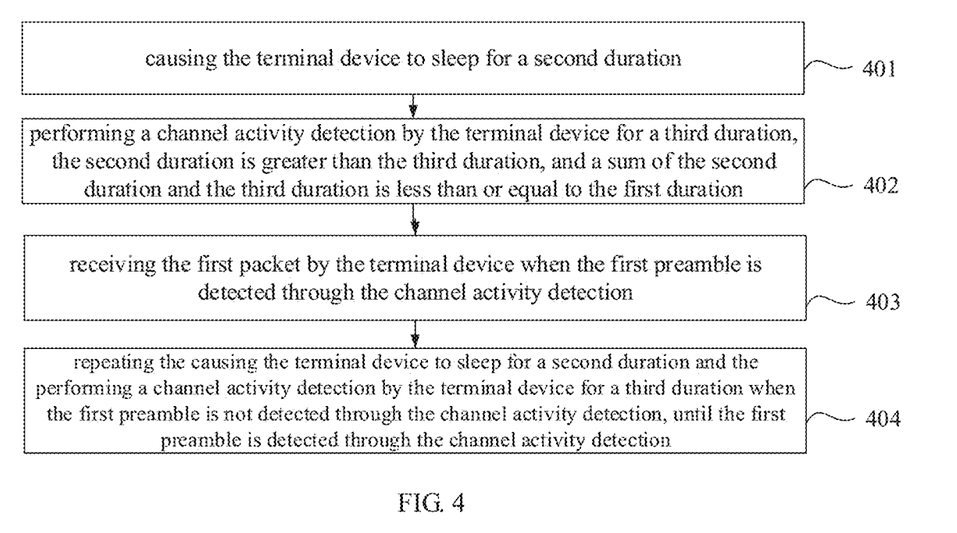
FIG. 4 shows a flowchart for receiving a first packet according to an embodiment of the present disclosure.

FIG. 4 shows a flowchart for receiving a first packet according to an embodiment of the present disclosure. Referring to FIG. 4 in conjunction with FIG. 3, in order to ensure real-time data communication and further reduce the power consumption of the terminal device, in some implementations, the transmission duration of the first preamble is the first duration n1, and the communication method may further include steps 401 and 402 before step 301.

In step 401, the terminal device sleeps for a second duration p1.

In step 402, the terminal device performs a channel activity detection for a third duration q1, where the second duration p1 is greater than the third duration q1, and a sum of the second duration p1 and the third duration q1 is not greater than the first duration n1.

Since n1 is not less than p1+q1, during the first duration n1, the terminal device must perform the channel activity detection once, so as to ensure that the terminal device can perform, at least once, the channel activity detection on the first preamble in each first packet transmitted by the gateway device 12, this ensures that the terminal device 11 can receive the first packet transmitted by the gateway device 12 in time, and perform a timely and effective interaction. At the same time, since the second duration p1 that the terminal device 11 sleeps is greater than the third duration q1 for the channel activity detection, the terminal device 11 is in a sleep state most of the time, thereby greatly reducing the power consumption of the terminal device.

Figure 5:
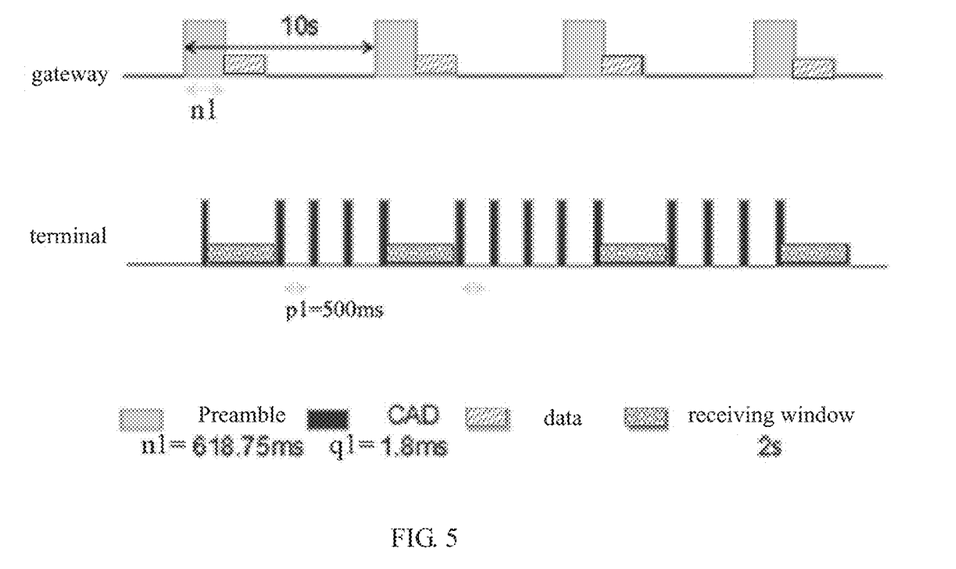
FIG. 5 shows a schematic diagram of a communication principle based on LoRa technology according to an embodiment of the present disclosure.

FIG. 5 shows a schematic diagram of a communication principle based on LoRa technology according to an embodiment of the present disclosure. Referring to FIG. 5, in some implementations, the length of the first preamble transmitted by the gateway device 12 is 600 bits, the transmission duration (first duration) n1 of the first preamble is 618.75 ms, and the third duration q1 that the terminal device 11 performs the channel activity detection once is about 1.8 ms. In order to satisfy p1+q1≤n1, a sleep duration (second duration) p1 needs to be less than or equal to 616.95 ms. As shown in FIG. 5, the second duration p1 that the terminal device 11 sleeps is set to be equal to 500 ms.

In this embodiment, when the gateway device 12 transmits each first packet, the first preamble of said first packet needs to be transmitted for 618.75 ms. The terminal device 11 performs the channel activity detection once every 500 ms of the sleep duration, and the duration for the channel activity detection is about 1.8 ms. In this way, it takes at most 501.8 ms (a detection period) to complete the signal detection, that is, the duration that the first preamble is transmitted is greater than the detection period, so that it can be guaranteed that as long as the gateway device 12 transmits the first packet, the terminal device 11 can successfully complete the channel activity detection during the transmission duration of the first preamble included in the first packet, this ensures that the detection of the first preamble cannot be missed, and thus the terminal device 11 can receive the first packet transmitted by the gateway device 12 timely, and packet loss phenomenon is avoided.

At the same time, the sleep duration (second duration) of the terminal device 11 may be 500 ms, that is, the RF chip included in the terminal device does not need to operate within the duration of 500 ms, and the RF chip enters a sleep mode. After the sleep mode, the RF chip is awakened and immediately enters the detection duration of 1.8 ms for performing the channel activity detection, which can further reduce the power consumption of the terminal device.

In some implementations, for example, in a case where an average current of the terminal device 11 in a receiving mode is 20 mA, and an average current of the terminal device 11 in the sleep mode is 1 μA, an average current of the terminal device 11 in the detection period can be calculated as:

(20×1.8+0.001×500)/501.8=0.072 mA

The current of the terminal device 11 of the present disclosure is significantly reduced compared to the average current of 20 mA of the terminal device 11 being always in the receiving mode.

In some implementations, referring to FIG. 4 in combination with FIG. 3, specifically, step 301 may include steps 403 and 404.

In step 403, when the first preamble is detected through the channel activity detection, the first packet from the gateway device is received by the terminal device.

In step 404, when no first preamble is detected through the channel activity detection; the terminal device sleeping for the second duration and performing the channel activity detection for the third duration are repeated until the first preamble is detected through the third channel detection.

In some implementations, after the terminal device 11 performs the channel activity detection for the duration of q1 once, the terminal device 11 continues to sleep for the duration of p1 if no first preamble is detected; on the other hand, if the first preamble is detected, the terminal device till receives and processes the first packet transmitted by the gateway device 12, and then continue to sleep for the duration of p1 to wait for the next wakening.

Figure 6:
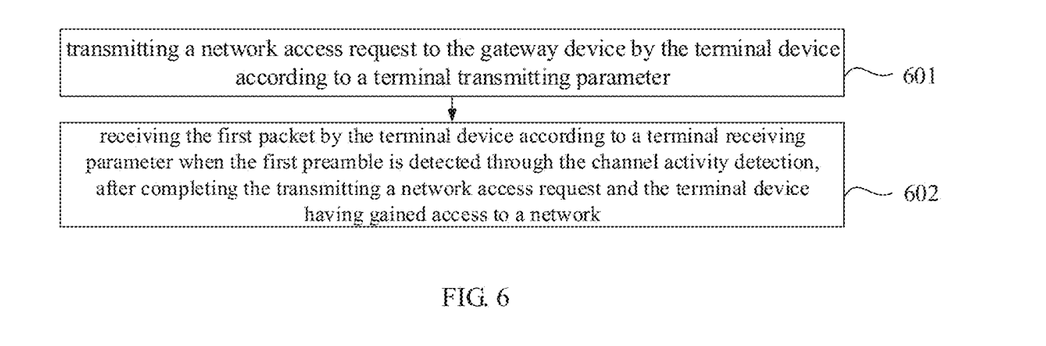
FIG. 6 shows a flowchart for receiving a first packet according to an embodiment of the present disclosure.

FIG. 6 shows a flowchart for receiving a first packet according to an embodiment of the present disclosure. Referring to FIG. 6, in some implementations, the communication method may further include step 601 before step 301.

In step 601, the terminal device transmits a network access request to the gateway device according to a terminal transmitting parameter.

Accordingly, step 301 may include step 602.

In step 602, after the transmission of the network access request is completed and the terminal device has gained access to the network, the first packet from the gateway device is received by the terminal device according to a terminal receiving parameter when the first preamble is detected through the channel activity detection.

In the present application, the terminal transmitting parameter and the terminal receiving parameter are parameters used by the terminal device in transmitting/receiving packets.

In some implementations, the terminal transmitting parameter includes the length of the second preamble, and the terminal receiving parameter includes the length of the first preamble.

Figure 7:
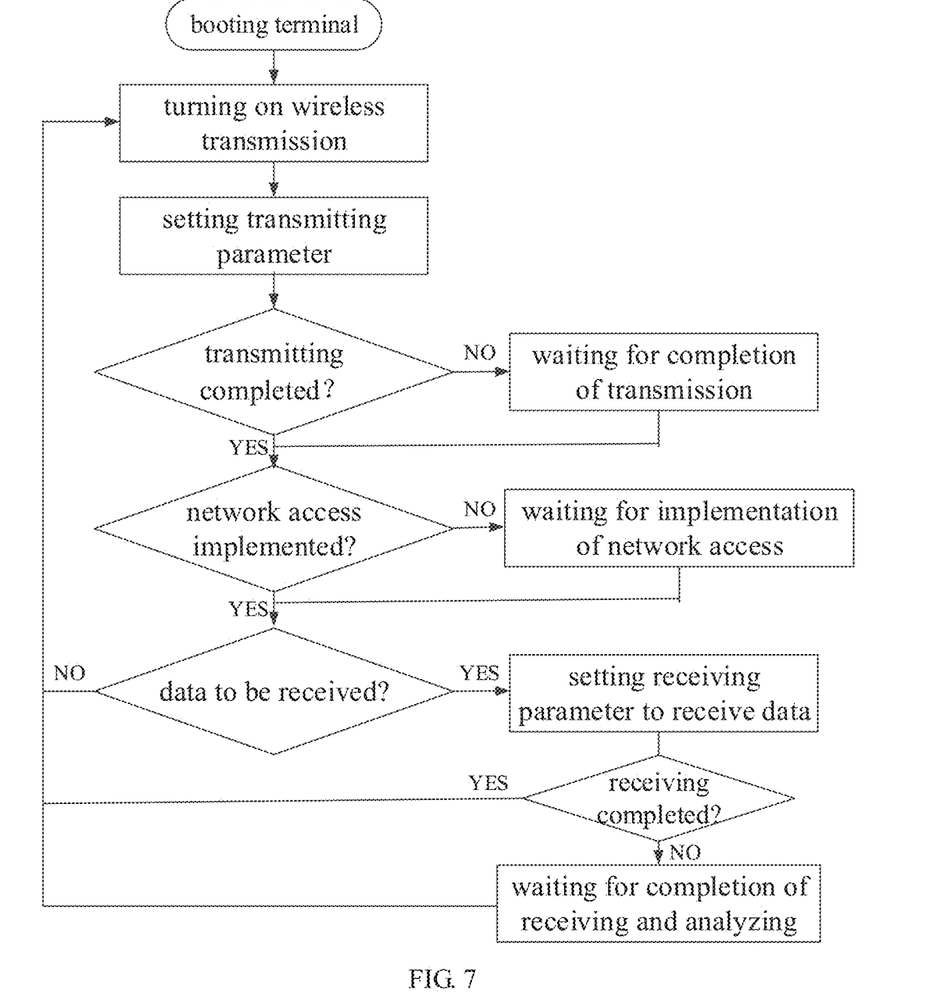
FIG. 7 shows a flowchart of a communication method of a terminal device according to an embodiment of the present disclosure.

FIG. 7 shows a flowchart of a communication method of a terminal device according to an embodiment of the present disclosure. Referring to FIG. 7, in some implementations, after the terminal device is booted, a wireless transmission mode of the terminal device is turned on and the terminal transmitting parameter (which corresponds to the second preamble, for example, the transmission duration of 2.8 ms) is set, and then the terminal transmits a network access request to the gateway device. When the network access request is transmitted and the terminal device (i.e., Node) has gained access to the network, the terminal device performs the channel activity detection to detect whether there is data (first packet) to be received from the gateway. If the first preamble is detected, the terminal then sets the terminal receiving parameter (which corresponds to the first preamble, for example, the transmission duration of 618.75 ms) to receive the data, and analyzes the received data after the completion of receiving the data. If it is detected that the transmission of the network access request is not completed, the terminal device waits for the transmission of the network access request to be completed and then detects whether the terminal device gains access to the network. If it is detected that the terminal device has not gained access to the network, the terminal device waits until the terminal device has gained access to the network and then the terminal device performs the channel activity detection. If no first preamble is detected through the channel activity detection, the terminal device then can enter the sleep state.

According to the communication method for the terminal device of the present disclosure, the communication protocol adopts an interactive communication mechanism. Since the transmission state can be autonomously controlled by a program included in the terminal device, the terminal device can be changed into the receiving state after that the transmission of the data has been finished, and a default state of the terminal device is set to the receiving state, which can ensure that the information from the other party (e.g., the gateway device) can be received.

In some implementations, the setting of the terminal receiving parameter may be optional, which may depend on an actual situation. The technical solution of the present disclosure can be applied to scenarios that require real-time and reliable data interaction such as license plate positioning, warehousing logistics management, and so on, thereby reducing the power consumption of the terminal device.

Figure 8:
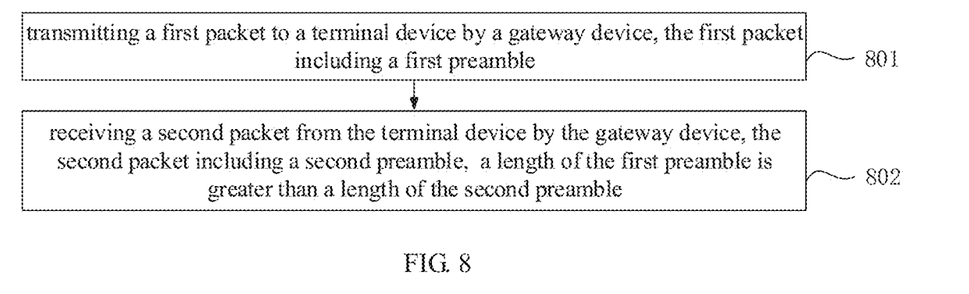
FIG. 8 shows a flowchart of a communication method of a gateway device according to an embodiment of the present disclosure.

FIG. 8 shows a flowchart of a communication method of a gateway device according to an embodiment of the present disclosure. Referring to FIG. 8, the communication method may include steps 801 and 802.

In step 801, a first packet is transmitted to a terminal device by the gateway device, the first packet includes a first preamble.

In step 802, a second packet transmitted from the terminal device is received by the gateway device, the second packet includes a second preamble, a length of the first preamble is greater than a length of the second preamble.

In a case where other physical parameters of the gateway device and the terminal device are determined, the length of the preamble is proportional to a transmission duration of the preamble. The length of the first preamble is greater than the length of the second preamble, that is, the transmission duration of the first preamble is greater than the transmission duration of the second preamble. In some implementations, for example, the transmission duration of the first preamble (the longer preamble) is 618.75 ms, the transmission duration of the second preamble (the shorter preamble) is 2.8 ms, and a current when the terminal device transmits data is about 120 mA, the energy consumed in transmission of the preamble when the terminal device transmits each packet (the transmission period is 10 s) is 120 mA×2.8 ms/(1000× 3600)≈0.00009 mA·h. However, with respect to a case where the transmission duration of the first preamble is the same as that of the preamble transmitted by the traditional terminal device (e.g., 618.75 ms), the energy consumed in transmission of the preamble when the terminal device transmits each packet (the transmission period is 10 s) is 120 mA×618.75 ms/(1000×3600)=0.02 mA·h. It can be seen that, for the terminal device that frequently transmit data to the gateway device interactively, it is possible to reduce power consumption greatly by using the communication method provided by the present disclosure compared with the conventional communication method.

According to the communication method provided by the present disclosure, the length of the second preamble transmitted by the terminal device is shorter than the length of the first preamble transmitted by the gateway device, thus for the terminal device that frequently transmits data to the gateway device interactively, such as an indoor positioning terminal device for Internet of Things, this can reduce power consumption of the terminal device greatly. In addition, since the shorter second preamble occupies a fewer channel, this can increase the number of terminal devices coupled to the same gateway device.

Figure 9:
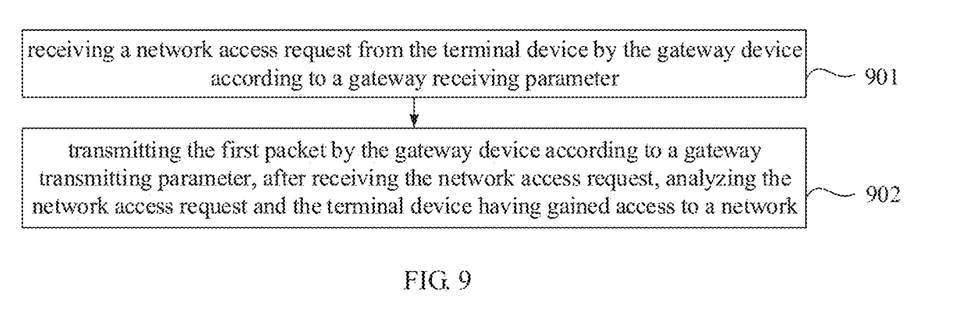
FIG. 9 shows a flowchart for transmitting a first packet according to an embodiment of the present disclosure.

FIG. 9 shows a flowchart for transmitting a first packet according to an embodiment of the present disclosure. Referring to FIG. 9, in some implementations, the communication method may further include step 901 before step 801.

In step 901, the gateway device receives the network access request from the terminal device according to a gateway receiving parameter.

Accordingly, step 801 may include step 902.

In step 902, after receiving the network access request, analyzing the network access request, and the terminal device having gained access to the network, the gateway device transmits the first packet to the terminal device according to a gateway transmitting parameter.

In some implementations, when the network access request is not received and after the terminal device has gained access to the network, the first packet is transmitted to the terminal device by the gateway device according to the gateway transmitting parameter.

In the present application, the gateway transmitting parameter and the gateway receiving parameter are parameters used by the gateway device in transmitting/receiving packets.

In some implementations, the gateway receiving parameter includes the length of the second preamble, and the gateway transmitting parameter includes the length of the first preamble.

Figure 10:
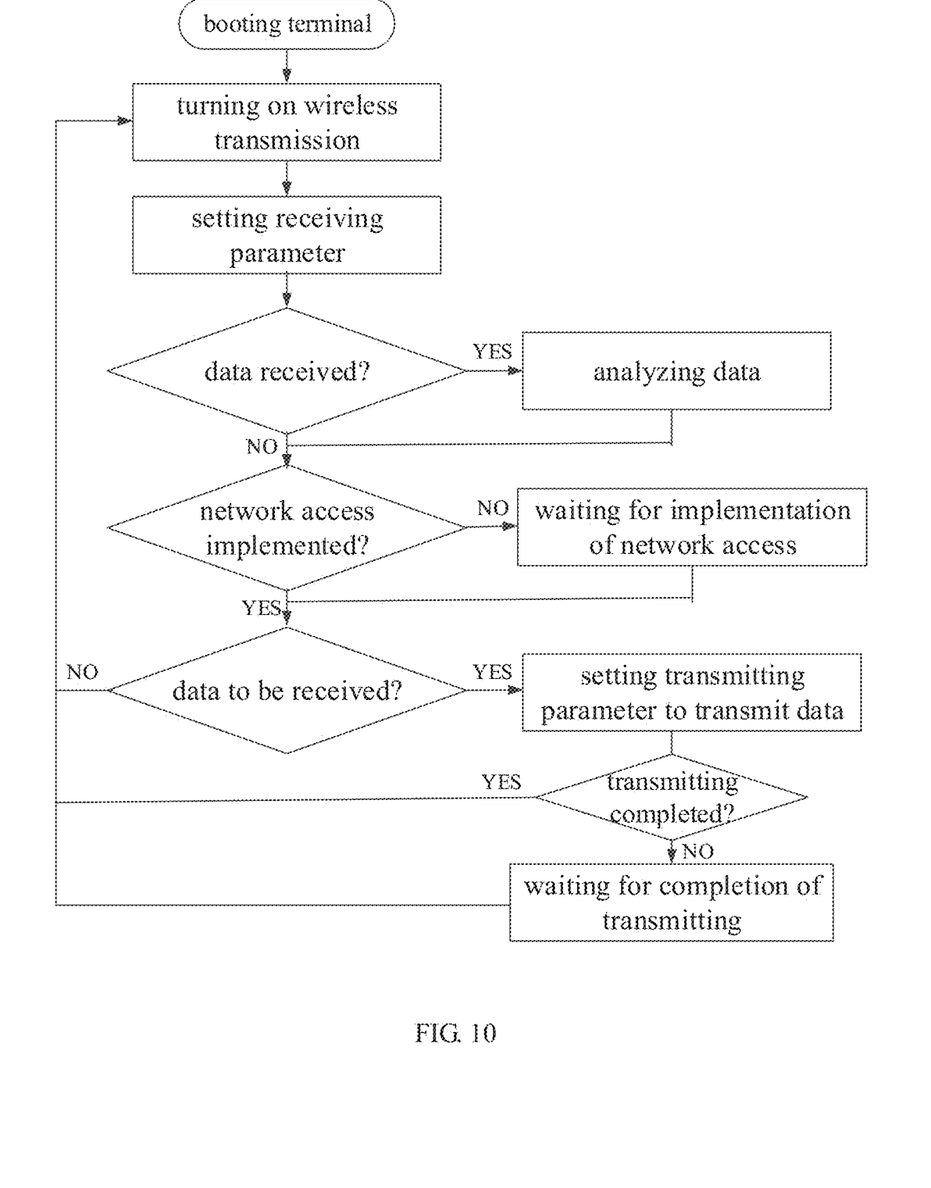
FIG. 10 shows a flowchart of a communication method of a gateway device according to an embodiment of the present disclosure.

FIG. 10 shows a flowchart of a communication method of a gateway device according to an embodiment of the present disclosure. Referring to FIG. 10, in some implementations, after a gateway device is booted, a wireless receiving mode of the gateway device is turned on and the gateway receiving parameter (which corresponds to the second preamble, for example, the transmission duration of 2.8 ms) is set, and then the gateway device determines whether a network access request transmitted by the terminal device is received. When the network access request is detected and after analyzing the network access request, or when the network access request is not detected, the gateway device detects whether the terminal device (i.e., node) has gained access to the network. If the terminal device has gained access to the network (that is, the terminal device has been connected to the gateway) and there is data to be transmitted to the terminal device from the gateway device, the gateway device can set the gateway transmitting parameter to transmit the data to the terminal device until the transmission of the data is completed. If it is detected that the terminal has not gained access to the network, the gateway device waits until the terminal device has gained access to the network access, and then determines whether there is data to be transmitted to the terminal.

According to the communication method for the gateway device of the present disclosure, the communication protocol adopts an interactive communication mechanism. Since the transmission state can be autonomously controlled by a program included in the gateway device, the gateway device can be changed into the receiving state after that the transmission of the data has been finished, and the default state of the gateway device is set to the receiving state, which can ensure that the information from the other party (for example, the terminal device) can be received.

In some embodiments, the setting of the gateway receiving parameter may be optional, which may depend on an actual situation. The technical solution of the present disclosure can be applied to scenarios that require real-time and reliable data interaction such as license plate positioning, warehousing logistics management, and so on, thereby reducing the power consumption of the terminal device.

Figure 11:
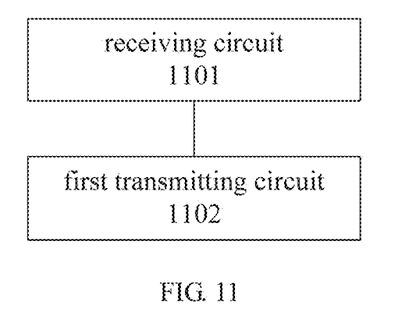
FIG. 11 shows a schematic structural diagram of a terminal device according to an embodiment of the present disclosure.

FIG. 11 shows a schematic structural diagram of a terminal device according to an embodiment of the present disclosure. Referring to FIG. 11, in some embodiments, the terminal device may include: a receiving circuit 1101 configured to receive a first packet from a gateway device, the first packet includes a first preamble; and a first transmitting circuit 1102 configured to transmit a second packet to the gateway device, the second packet includes a second preamble, a length of the first preamble is greater than a length of the second preamble.

Figure 12:
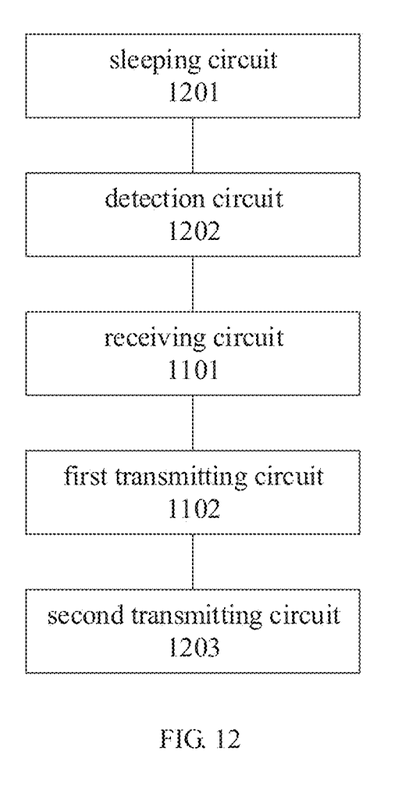
FIG. 12 shows a schematic structural diagram of a terminal device according to an embodiment of the present disclosure.

FIG. 12 shows a schematic structural diagram of a terminal device according to an embodiment of the present disclosure. Referring to FIG. 12 in conjunction with FIG. 11, in some implementations, a transmission duration of the first preamble is a first duration, and in addition to the components shown in FIG. 11, the terminal device may further include: a sleeping circuit configured to cause the terminal device to sleep for a second duration; and a detection circuit 1202 configured to perform a channel activity detection for a third duration, the second duration is greater than the third duration, a sum of the second duration and the third duration is not greater than the first duration.

In some implementations, specifically, the receiving circuit 1101 is configured to: receive the first packet when the detection circuit 1202 detects the first preamble; and call the sleep circuit 1201 and the detection circuit 1202 repeatedly when the detection circuit 1202 does not detect the first preamble, until the detection circuit 1202 detects the first preamble.

In some implementations, as shown in FIG. 12, the terminal device may further include: a second transmitting circuit 1203 configured to transmit a network access request to the gateway device according to a terminal transmitting parameter. In some implementations, specifically, the receiving circuit 1101 is further configured to: receive the first packet from, for example, the gateway device according to the terminal receiving parameter when the detection circuit 1202 detects the first preamble, after the second transmitting circuit completes a transmission of the network access request and the terminal device has gained access to the network.

In some implementations, the terminal transmitting parameter includes the length of the second preamble, and the terminal receiving parameter includes the length of the first preamble.

For the sake of brevity, the operation method of each circuit in the terminal device in the above embodiments has been described in detail in the embodiments of the communication method for the terminal device of the present disclosure, and their detail description will be omitted here.

Figure 13:
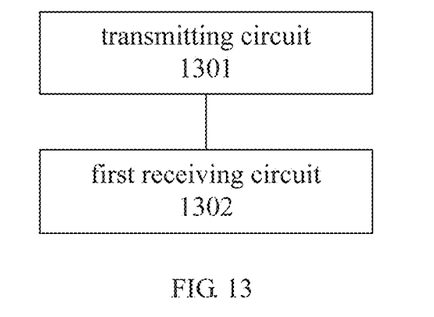
FIG. 13 shows a schematic structural diagram of a gateway device according to an embodiment of the present disclosure and FIG. 14 shows a schematic structural diagram of a gateway device according to an embodiment of the present disclosure.

FIG. 13 shows a schematic structural diagram of a gateway device according to an embodiment of the present disclosure. Referring to FIG. 13, in some implementations, the gateway device may include: a transmitting circuit 1301 configured to transmit a first packet to a terminal device, the first packet includes a first preamble; and a first receiving circuit 1302 configured to receive a second packet from the terminal device, the second packet includes a second preamble, a length of the first preamble is greater than a length of the second preamble.

Figure 14:
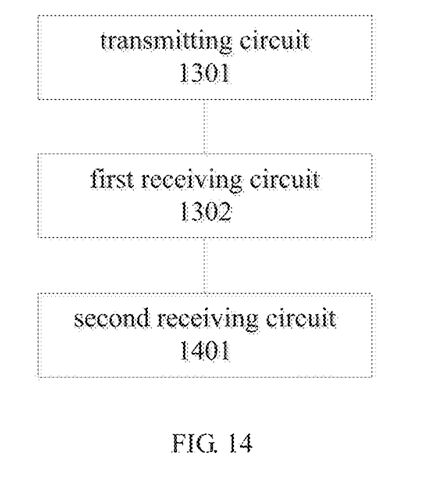

FIG. 14 shows a schematic structural diagram of a gateway device according to an embodiment of the present disclosure. Referring to FIG. 14, in some implementations, in addition to the circuits shown in FIG. 13, the gateway device may further include: a second receiving circuit 1401 configured to receive a network access request from the terminal device according to a gateway receiving parameter.

In some implementations, specifically, the second receiving circuit 1401 may be configured to: transmit the first packet to the terminal device according to a gateway transmitting parameter after receiving the network access request from the terminal device, analyzing the network access request and the terminal device having gained access to the network access, or when the network access request is not received and after that the terminal device has gained access to the network access.

In some implementations, the gateway receiving parameter includes the length of the second preamble, and the gateway transmitting parameter includes the length of the first preamble.

For the sake of brevity, the operation method of each circuit in the gateway device in the above embodiments has been described in detail in the embodiments of the communication method for the gateway device of the present disclosure, and their detail description will be omitted here.

The present disclosure also provides a communication system. Referring to FIG. 1, in some implementations, the communication system may include the terminal device 11 and the gateway device 12. In some implementations, the gateway device 12 is configured to transmit a first packet to the terminal device 11 and receive a second packet from the terminal device, the terminal device 11 is configured to receive the first packet and transmit the second packet to the gateway device 12, the first packet includes a first preamble, the second packet includes a second preamble, and a length of the first preamble is greater than a length of the second preamble.

In some implementations, the communication system may also include a server 13. The terminal device 11 (e.g., a positioning badge, warehouse goods, etc.) may be used to collect information and upload data to the gateway device 12 by a LoRa wireless signal. The gateway device 12 may be used to relay the data uploaded by the terminal device 11 to the server 13 and relay the data transmitted by the server 13 to the terminal device 11. The server 13 is used to analyze the data uploaded by the terminal device 11, and control the behavior of the gateway device 12 and the terminal device 11. In some implementations, in order to enable to transmit and receive LoRa wireless signals, the terminal device 11 and the gateway device 12 may be provided with a LoRa radio frequency (RF) chip respectively.

The communication system according to the present disclosure may include a first operation mode in which the gateway transmits packets and the terminal receives the packets, and a second mode in which the gateway receives packets and the terminal transmits the packets. The first and second operation modes adopt preambles with different lengths, that is, the length of the second preamble transmitted by the terminal is shorter than the length of the first preamble transmitted by the gateway, thus can save the power consumed by the terminal to the greatest extent.

In a case where other physical parameters of the gateway and the terminal are determined, the length of the preamble is proportional to a transmission duration of the preamble. The length of the first preamble is greater than the length of the second preamble, that is, the transmission duration of the first preamble is greater than the transmission duration of the second preamble. In some implementations, for example, the transmission duration of the first preamble (the longer preamble) is 618.75 ms, the transmission duration of the second preamble (the shorter preamble) is 2.8 ms, and a current when the terminal device transmits data is about 120 mA, the energy consumed in transmission of the preamble when the terminal device transmits each packet (the transmission period is 10 s) is 120 mA×2.8 ms/(1000×3600) ≈0.00009 mA·h. However, compared with a case where the transmission duration of the first preamble is the same as that of the preamble transmitted by the traditional terminal (e.g., 618.75 ms), the energy consumed in transmission of the preamble when the terminal transmits each packet (the transmission period is 10 s) is 120 mA×618.75 ms/(1000×3600)=0.02 mA·h. It can be seen that for the terminal that frequently transmit data to the gateway device interactively, it is possible to reduce power consumption greatly by using the communication method provided by the present disclosure compared with the conventional communication method.

According to the communication system provided by the present disclosure, the length of the second preamble used by the terminal is shorter than the length of the first preamble used by the gateway, and thus for the terminal that frequently transmits data interactively, such as an indoor positioning terminal device for Internet of Things, this can reduce power consumption of the terminal greatly. In addition, since the shorter second preamble occupies a fewer channel, this can increase the number of terminal coupled to the same gateway.

According to the communication system provided by the present disclosure, the communication protocol adopts an interactive communication mechanism. Since the transmission states can be autonomously controlled by programs included in the terminal device and the gateway device, respectively, the terminal device and the gateway device can be changed into the receiving state after that the transmission of the data has been finished, respectively, and the default states of the terminal device and the gateway device are respectively set to the receiving states, which can ensure that the information from another party (e.g., the terminal device or the gateway device) can be received.

In some embodiments, the terminal transmitting parameter and the gateway receiving parameter both may include the length of the second preamble, the terminal receiving parameter and the gateway transmitting parameter both may include the length of the first preamble. In some implementations, the setting of the gateway receiving parameter and the terminal receiving parameter may be optional, which may depend on an actual situation.

The technical solution of the present disclosure can be applied to scenarios that require real-time and reliable data interaction such as license plate positioning, warehousing logistics management, and so on, thereby reducing the power consumption of the terminal device.

The embodiments of the present disclosure are described in a progressive manner. Each embodiment focuses on the differences from other embodiments, and the same or similar parts between the various embodiments can be referred to each other.

It should be noted that in this description, relational terms such as "first", "second" and the like are used only to distinguish one entity or operation from another entity or operation, and do not necessarily require or imply that there is any such actual relationship or order among these entities or operations. Moreover, the terms "include", "comprise" or any other variant thereof are intended to cover non-exclusive inclusion, so that a process, method, apparatus or device that includes a series of elements includes not only those elements, but also those that are not explicitly listed or other elements that are inherent to this process, method, apparatus or device. Without more restrictions, the element defined by the sentence "include a . . . " does not exclude that there are other identical elements in the process, method, apparatus or device that includes the element.

The communication system, gateway device, terminal device, and communication method provided by the present disclosure are described in detail above. Specific embodiments are used in this description to explain the principles and implementations of the present disclosure, and the above description of the embodiments is only used to help understand the methods and core ideas of the present disclosure. It should be noted that for those of ordinary skill in the art, there will be various modifications in the specific implementation and the scope of application according to the ideas of the present disclosure. In summary, the content disclosed herein should not be construed as limiting the present disclosure.

It is to be understood that the above description is only for the purpose of illustrating the principles of the present disclosure, but the disclosure is not limited thereto. Various modifications and improvements can be made by those skilled in the art without departing from the spirit and scope of the disclosure, and such modifications and improvements are also considered to be within the scope of the disclosure.

What is claimed is:

1. A communication method, comprising:
receiving, by a terminal device, a first packet from a gateway device, the first packet comprising a first preamble; and
transmitting, by the terminal device, a second packet to the gateway device, the second packet comprising a second preamble,
wherein a length of the first preamble is greater than a length of the second preamble, and
a transmission duration of the first preamble is a first duration, and
the communication method further comprises: before the receiving, by a terminal device, a first packet from a gateway device,
causing the terminal device to sleep for a second duration; and
performing by the terminal device, a channel activity detection for a third duration,
wherein the second duration is greater than the third duration, and a sum of the second duration and the third duration is less than or equal to the first duration.

2. The communication method of claim 1, wherein
the receiving, by a terminal device, a first packet from a gateway device comprises:
receiving, by the terminal device, the first packet when the first preamble is detected though the channel activity detection.

3. The communication method of claim 2, wherein
the receiving, by a terminal device, a first packet from a gateway device further comprises:
repeating the causing the terminal device to sleep for a second duration and the performing, by the terminal device, a channel activity detection for a third duration when the first preamble is not detected through the channel activity detection, until the first preamble is detected through the channel activity detection.

4. The communication method of claim 3, further comprising: before the receiving, by a terminal device, a first packet from a gateway device, transmitting, by the terminal device, a network access request to the gateway device according to a terminal transmitting parameter, and the receiving, by a terminal device, a first packet from a gateway device further comprises:

receiving, by the terminal device, the first packet according to a terminal receiving parameter when the first preamble is detected through the channel activity detection, after completing the transmitting a network access request and the terminal device having gained access to a network.

5. The communication method of claim 4, wherein
the terminal transmitting parameter comprises the length of the second preamble, and
the terminal receiving parameter comprises the length of the first preamble.

6. A communication method, comprising:
transmitting, by a gateway device, a first packet to a terminal device, the first packet comprising a first preamble;
receiving, by the gateway device, a second packet from the terminal device, the second packet comprising a second preamble,
wherein a length of the first preamble is greater than a length of the second preamble,
wherein the communication method further comprises:
before the transmitting, by a gateway device, a first packet to a terminal device,
receiving, by the gateway device, a network access request from the terminal device according to a gateway receiving parameter, and
the transmitting, by a gateway device, a first packet to a terminal device comprises:
transmitting, by the gateway device, the first packet according to a gateway transmitting parameter, after receiving the network access request, analyzing the network access request and the terminal device having gained access to a network, and wherein
the transmitting, by a gateway device, a first packet to a terminal device further comprises:
transmitting, by the gateway device, the first packet according to the gateway transmitting parameter, when the network access request is not received and after the terminal device has gained access to the network.

7. The communication method of claim 6, wherein
the gateway receiving parameter comprises the length of the second preamble, and
the gateway transmitting parameter comprises the length of the first preamble.

8. A terminal device, comprising:
a receiving circuit configured to receive a first packet from a gateway device, the first packet comprising a first preamble; and
a first transmitting circuit configured to transmit a second packet to the gateway device, the second packet comprising a second preamble,
wherein a length of the first preamble is greater than a length of the second preamble,
wherein a transmission duration of the first preamble is a first duration, and
the terminal device further comprises:
a sleep circuit configured to cause the terminal device to sleep for a second duration; and
a detection circuit configured to perform a channel activity detection for a third duration, wherein the second duration is greater than the third duration, and a sum of the second duration and the third duration is less than or equal to the first duration.

9. The terminal device of claim 8, wherein
the receiving circuit is further configured to:
receive the first packet when the detection circuit detects the first preamble; and
call the sleep circuit and the detection circuit repeatedly when the detection circuit does not detect the first preamble, until the detection circuit detects the first preamble.

10. The terminal device of claim 9, wherein
the terminal device also comprises:
a second transmitting circuit configured to transmit a network access request to the gateway device according to a terminal transmitting parameter; and
the receiving circuit is further configured to:
receive the first packet according to the terminal receiving parameter when the detection circuit detects the first preamble, after the second transmitting circuit completes a transmission of the network access request and the terminal device has gained access to a network.

11. The terminal device of claim 10, wherein
the terminal transmitting parameter comprises the length of the second preamble, and
the terminal receiving parameter comprises the length of the first preamble.

12. A gateway device for performing the communication method of claim 6, comprising:
a transmitting circuit configured to transmit a first packet to a terminal device, the first packet comprising a first preamble; and
a first receiving circuit configured to receive a second packet from the terminal device, the second packet comprising a second preamble, wherein a length of the first preamble is greater than a length of the second preamble;
wherein the communication method further comprises:
before the transmitting, by the gateway device, a first packet to a terminal device,
receiving, by the gateway device, a network access request from the terminal device according to a gateway receiving parameter, and
the transmitting, by a gateway device, a first packet to a terminal device comprises:
transmitting, by the gateway device, the first packet according to a gateway transmitting parameter, after receiving the network access request, analyzing the network access request and the terminal device having gained access to a network, and wherein
the transmitting, by a gateway device, a first packet to a terminal device further comprises:
transmitting, by the gateway device, the first packet according to the gateway transmitting parameter, when the network access request is not received and after the terminal device has gained access to the network.

13. The gateway device of claim 12, further comprising:
a second receiving circuit configured to receive a network access request from the terminal device according to a gateway receiving parameter.

14. The gateway device of claim 13, wherein
the transmitting circuit is further configured to:
transmit the first packet according to a gateway transmitting parameter after receiving the network access request, analyzing the network access request and the terminal device having gained access to the network.

15. The gateway device of claim 14, wherein the transmitting circuit is further configured to:

transmit the first packet according to the gateway transmitting parameter when the network access request is not received and after the terminal device has gained access to the network.

16. A communication system, comprising: the terminal device of claim 8 and a gateway device, wherein the gateway device comprises:

a transmitting circuit configured to transmit a first packet to the terminal device, the first packet comprising a first preamble; and a first receiving circuit configured to receive a second packet from the terminal device, the second packet comprising a second preamble, wherein the terminal device is configured to receive the first packet from the gateway device and transmit the second packet to the gateway device, and wherein a length of the first preamble is greater than a length of the second preamble;

Wherein the terminal device further comprises:

a sleep circuit configured to cause the terminal device to sleep for a second duration; and a detection circuit configured to perform a channel activity detection for a third duration, wherein the second duration is greater than the third duration, and a sum of the second duration and the third duration is less than or equal to the first duration.

* * * * *